US010735475B2

United States Patent
Phadnis et al.

(10) Patent No.: US 10,735,475 B2
(45) Date of Patent: Aug. 4, 2020

(54) SESSION INITIATION PROTOCOL (SIP) DIALOG RECONSTRUCTION THROUGH RECONSTRUCTION ANCHORS FOR USER AGENTS

(71) Applicant: Avaya Inc., Santa Clara, CA (US)

(72) Inventors: Mohan Vinayak Phadnis, Pune (IN); Sreekanth Subrahmanya Nemani, Pune (IN); Satyam Lad, Pune (IN)

(73) Assignee: Avaya Inc., Santa Clara, CA (US)

( * ) Notice: Subject to any disclaimer, the term of this patent is extended or adjusted under 35 U.S.C. 154(b) by 342 days.

(21) Appl. No.: 15/284,653

(22) Filed: Oct. 4, 2016

(65) Prior Publication Data

US 2018/0097851 A1 Apr. 5, 2018

(51) Int. Cl.
*H04L 29/06* (2006.01)
*H04L 29/12* (2006.01)

(52) U.S. Cl.
CPC ........ *H04L 65/105* (2013.01); *H04L 61/3085* (2013.01); *H04L 65/1006* (2013.01); *H04L 65/403* (2013.01)

(58) Field of Classification Search
CPC . H04L 65/105; H04L 65/403; H04L 61/3085; H04L 65/1006
See application file for complete search history.

(56) References Cited

U.S. PATENT DOCUMENTS

| | | | | |
|---|---|---|---|---|
| 8,750,291 B2 * | 6/2014 | Balasaygun | .......... | H04M 15/00 370/352 |
| 9,185,140 B2 | 11/2015 | Nemani et al. | | |
| 9,450,989 B2 * | 9/2016 | Braudes | .............. | H04L 65/1083 |
| 2007/0071223 A1 * | 3/2007 | Lee | .......... | H04M 3/48 379/265.02 |
| 2009/0013078 A1 * | 1/2009 | Bencheikh | .............. | H04L 65/80 709/227 |
| 2009/0049180 A1 * | 2/2009 | El | .......... | H04L 67/14 709/227 |
| 2012/0042084 A1 * | 2/2012 | Dutta | .................. | H04L 65/1016 709/228 |
| 2014/0101322 A1 * | 4/2014 | Nissim | ................ | H04L 65/1006 709/227 |
| 2015/0110113 A1 * | 4/2015 | Levy | ..................... | H04L 45/745 370/392 |

(Continued)

OTHER PUBLICATIONS

U.S. Appl. No. 14/802,015, filed Jul. 7, 2015, Phadnis et al.

*Primary Examiner* — Uzma Alam
(74) *Attorney, Agent, or Firm* — Sheridan Ross P.C.

(57) ABSTRACT

Embodiments of the disclosure are directed to a call reconstruction server. This server can act as a signaling anchor for various SIP UAs involved in the session and can be included in the signaling path between UAs. More specifically, the reconstruction server can insert an identifier such as a Uniform Resource Identifier (URI) into the headers of SIP signaling messages exchanged between UAs during initiation of a session such as a call or conference. These identifiers can be used to insert the reconstruction servers into the path of the session in a way that "bookends" the other servers and/or processes in the session between the UAs. When one of these servers and/or processes restarts, the reconstruction servers can initiate a reconstruction process that rebuilds the session without relying on specially adapted UAs.

19 Claims, 10 Drawing Sheets

(56) References Cited

U.S. PATENT DOCUMENTS

2017/0085455 A1* 3/2017 Chiang ............... H04L 65/1006
2017/0111407 A1* 4/2017 Kotnis ................ H04L 65/1083
2017/0353589 A1* 12/2017 Vaguine ............. H04L 65/1006
2018/0007612 A1* 1/2018 Jahangir ................ H04L 67/20

* cited by examiner

SESSION INITIATION PROTOCOL (SIP) DIALOG RECONSTRUCTION THROUGH RECONSTRUCTION ANCHORS FOR USER AGENTS

FIELD OF THE DISCLOSURE

Embodiments of the present disclosure relate generally to methods and systems for reconstructing a communication session and more particularly to reconstruction of Session Initiation Protocol (SIP) dialogs using reconstruction anchors for user agents in the dialog.

BACKGROUND

In the Session Initiation Protocol (SIP), a dialog for a communication is setup for different kinds of communications sessions, such as voice, video, text, and the like. The initial signaling to establish the dialog for the communication session is typically setup using a SIP proxy server and/or a Back-to-Back User Agent (B2BUA). Once the communication session is setup using the SIP Proxy server and/or the B2BUA, a media session may be created directly between user agents in SIP endpoint devices. For example, a SIP proxy server can setup an initial voice call between two SIP endpoint devices. Once the initial voice call is established by the proxy server, the communication session voice call can be setup (e.g., using Real-Time Protocol (RTP)) directly between the two communication devices.

This call setup model creates some problems if the SIP Proxy server in the above example or another server such as an application server providing features to the session fails during the communication session. For example, if a user of a SIP device involved in the communication session wants to transfer a voice call, the user of the SIP device will be unable to transfer the voice call even if the server has been reinitialized or failed over to a new server. This is because the reinitialized/new server is unaware of the previous session. Previous solutions to this problem have included reconstructing a session between the UAs. However, these solutions rely on support from the individual SIP UAs involved and only work in sessions between UAs specifically coded to perform the reconstruction. This limits the applicability of these approaches since sessions involving incoming SIP Trunks, third-party UAs, mobile networks, etc. cannot be reconstructed. Hence, there is a need for improved methods and systems for reconstructing a communication session such as a SIP call or conference.

BRIEF SUMMARY

Embodiments of the disclosure provide systems and methods for reconstruction of Session Initiation Protocol (SIP) dialogs using reconstruction anchors for user agents in the dialog. Generally speaking, embodiments of the disclosure are directed to a call reconstruction server. This server can act as a signaling anchor for various SIP UAs involved in the session and can be included in the signaling path between UAs. More specifically, the reconstruction server can insert an identifier such as a Uniform Resource Identifier (URI) into the headers of SIP signaling messages exchanged between UAs during initiation of a session such as a call or conference. These identifiers can be used to insert the reconstruction servers into the path of the session in a way that "bookends" the other servers and/or processes in the session between the UAs. When one of these servers and/or processes restarts, the reconstruction servers can initiate a reconstruction process that rebuilds the session without relying on specially adapted UAs.

Figure 1:
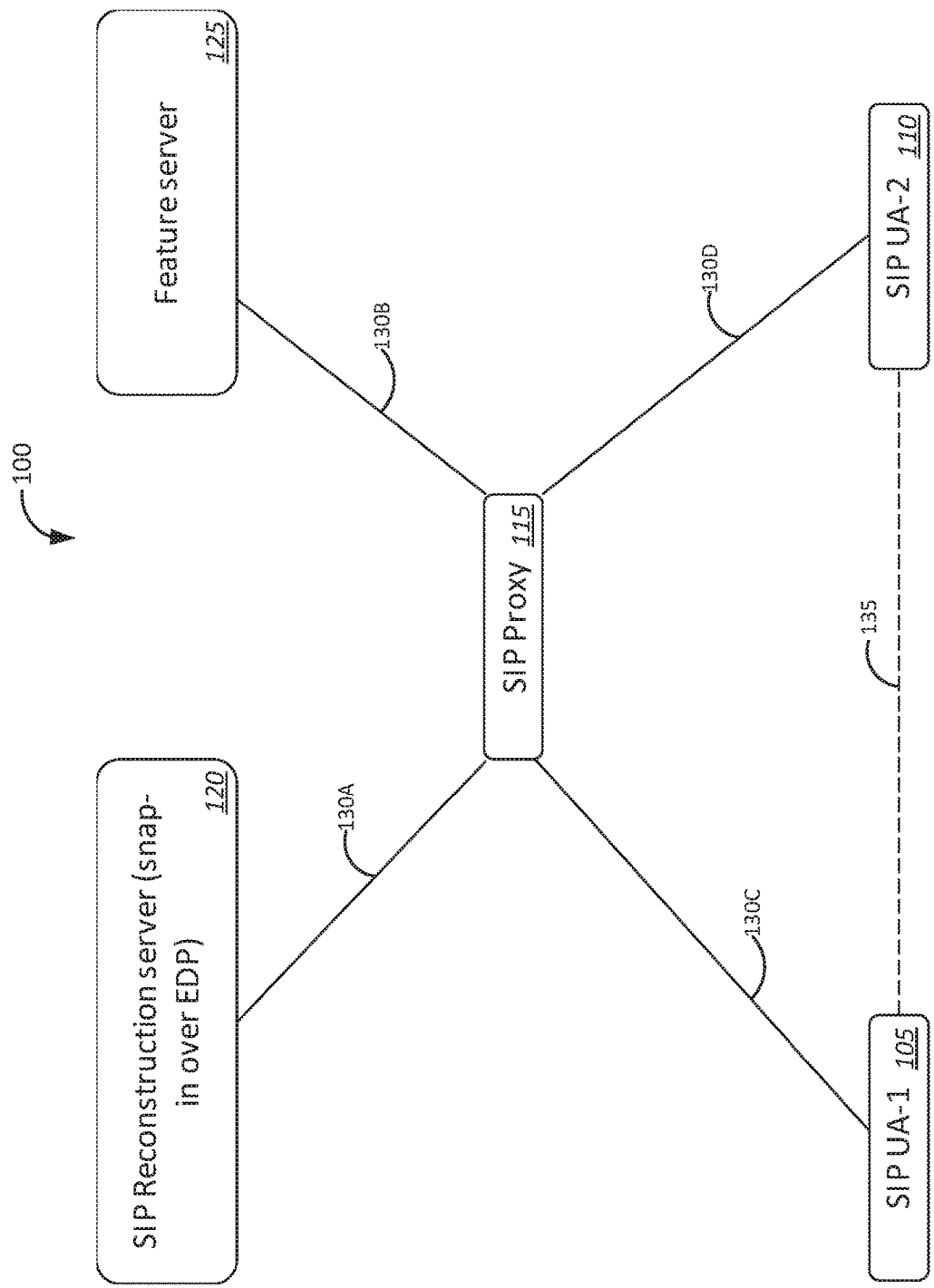
FIG. 1 is a block diagram illustrating elements of a system for reconstructing SIP dialogs using reconstruction anchors for user agents in a call between endpoints according to one embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosure herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for reconstruction of Session Initiation Protocol (SIP) dialogs using reconstruction anchors for user agents in the dialog. Generally speaking, embodiments of the disclosure are directed to a call reconstruction server. This server can act as a signaling anchor for various SIP UAs involved in the session and can be included in the signaling path between UAs. More specifically, the reconstruction server can insert an identifier such as a Uniform Resource Identifier (URI) into the headers of SIP signaling messages exchanged between UAs during initiation of a session such as a call or conference. These identifiers can be used to insert the reconstruction servers into the path of the session in a way that "bookends" the other servers and/or processes in the session between the UAs. When one of these servers and/or processes restarts, the reconstruction servers can initiate a reconstruction process that rebuilds the session without relying on specially adapted UAs.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of a system for reconstructing SIP dialogs using reconstruction anchors for user agents in a call between endpoints according to one embodiment. As illustrated in this example, the system 100 can comprise a number of user agents 105 and 110. The user agents 105 and 110 can be any hardware/software that can process SIP communications such as a SIP telephone application, a SIP Instant Messaging (IM) application, a SIP video conference application, a SIP email application, a SIP softphone in a PC, a SIP application in a set-top box, and the like. The user agents may be implemented in any of a variety of communication devices including but not limited to a telephone, a Personal Computer (PC), a tablet device, a cellular telephone, a Personal Digital Assistant (PDA), a television, a set-top box, a FAX machine, a pager, and others. It should be noted and understood that, while only two user agents 105 and 110 are illustrated here for the sake of simplicity and clarity, any number of user agents may be used with various embodiments described herein.

The system 100 can include a SIP proxy 115. As known in the art, the SIP proxy 115 may be implemented by or as part of a SIP server (not shown here) which can comprise any hardware/software that can process communications, such as a network server, a Private Branch Exchange (PBX), a Session Manager, a communication system, a router, a central exchange, and/or others. The user agents 105 and 110 can be coupled with the SIP proxy 115 and each other via one or more communication networks (not shown here) as known in the art such as the Internet, a Wide Area Network (WAN), a Local Area Network (LAN), the Public Switched Telephone Network (PSTN), a packet switched network, a circuit switched network, a cellular network, any combination of these, and the like. The network can use a variety of protocols, such as Ethernet, Internet Protocol (IP), Session Initiation Protocol (SIP), Asynchronous Transfer Mode (ATM), Integrated Services Digital Network (ISDN), H.323, and the like. The SIP proxy 115 can establish a SIP session dialog between the user agents 105 and 110 using standard SIP processes. For example, the user agents 105 and 110 may be involved in a voice call, a video call, a video conference or a voice conference. Once the SIP session dialog between user agents 105 and 110 is established, a media exchange 135 can be directly established between the user agents 105 and 110. For example, a voice or video media stream may be established between user agents 105 and 110 using Real Time Protocol (RTP). In this illustrative embodiment, the media stream is not sent through the SIP Proxy server 115. However, in other embodiments the media steam may be sent through the SIP proxy server 115.

The system 100 can also include a feature server 125. Generally speaking, the feature server 125 can comprise any one or more physical and/or virtual machines adapted to provide one or more features to the session dialog established between the user agents 105 and 110. For example, the feature server 125 can comprise an application server providing features including but not limited to call control, media control, charging, access control, etc.

The system 100 can also include a reconstruction server 120 which may comprise any of a variety of physical and/or virtual machines. It should be noted that, while illustrated here as a separate element from the SIP proxy 115 and feature server 125 for the sake of clarity, the reconstruction server 120 may, in some implementations, be implemented as part of or collocated with the same physical and/or virtual machines providing the SIP proxy 115 and/or feature server 125.

During the session dialog, the reconstruction server 120 and feature server 125 can exchange SIP signaling messages 130A and 130B with the proxy server 115 via one or more of the communication networks described above. Similarly, the SIP proxy 115 can exchange SIP signaling messages 130C and 130D with the user agents 105 and 110. However, at some point during the session dialog, the feature server 125 may become unavailable. For example, the feature server 125 may experience a restart causing it to lose the session information for the dialog. In this case, the media exchange 135 between the agents 105 and 110 and the signaling exchanges 130A, 130C, and 130D between the user agents 105 and 110, SIP proxy 115, and reconstruction server 120 can continue. However, a request from one of the user agents 105 or 110 in the dialog for one of the features provided by the feature server 125 cannot be handled since the feature server 125 has lost the session information.

Generally speaking, the reconstruction server 120 can provide a reconstruction anchor for each of the user agents 105 and 110 in the session dialog. These reconstruction anchors can allow for the reconstruction of the dialog in the event of a restart of a server in the dialog such as the feature server 125. Through these anchors, the reconstruction server 120 handles the signaling required to reconstruct the session once the feature server 125 has restarted by establishing a new dialog that can replace the original dialog while continuing the session. In this way, the sequencing of the dialog can be maintained between the original dialog and the new dialog. Since the reconstruction server 120 handles processing and control of the signaling through the reconstruction anchors for each user agent 105 and 110, the user agents 105 and 110 are not required to perform or be adapted to handle any special processing other than the standard handling of SIP messages. Additional details of the processes for using such reconstruction anchors will now be described with reference to FIGS. 2-6.

Figure 2:
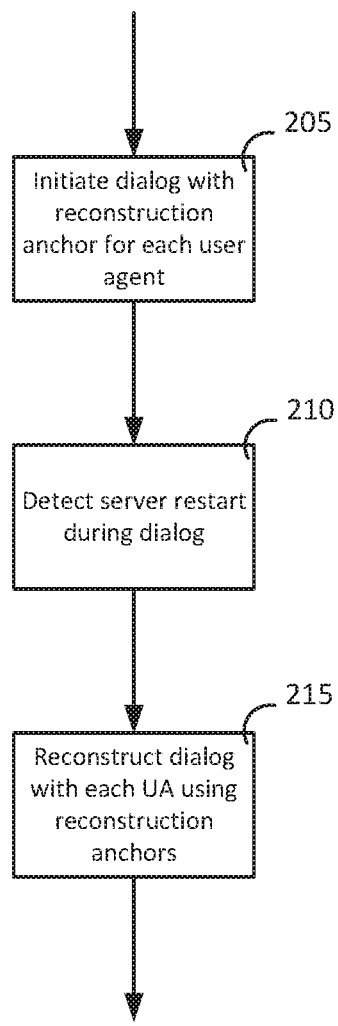
FIG. 2 is a flowchart illustrating an exemplary process for using reconstruction anchors for user agents in a communication session according to one embodiment.

FIG. 2 is a flowchart illustrating an exemplary process for using reconstruction anchors for user agents in a communication session according to one embodiment. In this example, reconstruction of a communication session using reconstruction anchors can begin with initiating 205, by a reconstruction server for a user agent, a Session Initiation Protocol (SIP) dialog with the user agent on the communication network. The user agent can participate in the SIP dialog with one or more other endpoints on the communication network and the reconstruction server for a user agent can provide a reconstruction anchor for the user agent in the SIP dialog. Additional details of exemplary processes for initiating 205 a dialog will be described below with reference to FIGS. 3 and 8. At some point during the dialog, the reconstruction server for a user agent can detect 210 a restart of a server providing one or more features to the SIP dialog. For example, the user agent may request a feature such as call forwarding but find the feature unavailable due to unavailability of the server providing that feature. The reconstruction server for a user agent can, upon restate of the server providing the feature, reconstruct 215 the SIP dialog between the user agent and the one or more other endpoints using the reconstruction anchor. Additional details of exemplary processes for reconstructing a dialog using reconstruction anchors will be described below with reference to FIGS. 4 and 9.

Figure 3:
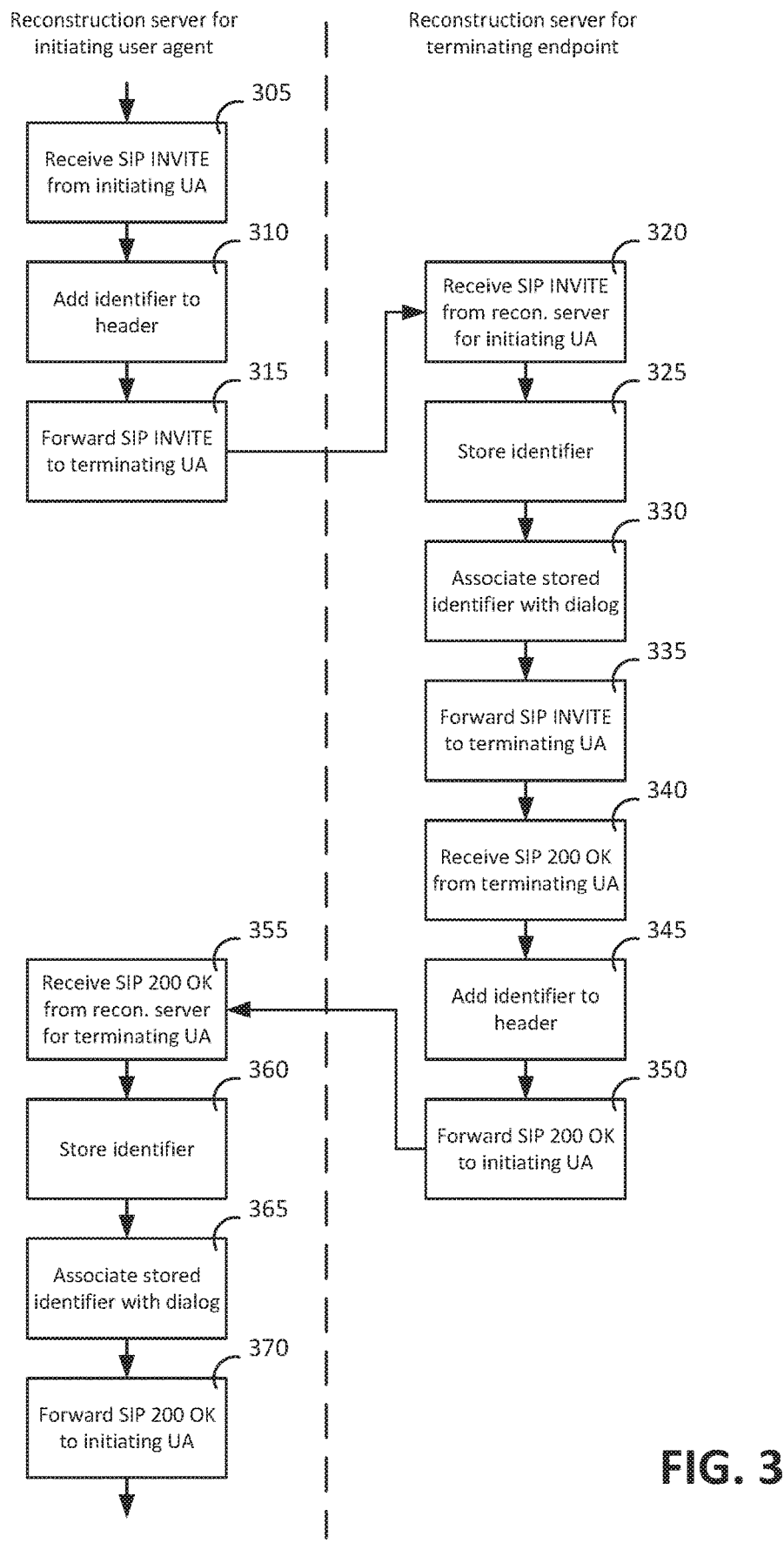
FIG. 3 is a flowchart illustrating additional details of an exemplary process for initiating a dialog using reconstruction anchors between user agents according to one embodiment.

FIG. 3 is a flowchart illustrating additional details of an exemplary process for initiating a dialog using reconstruction anchors between user agents according to one embodiment. More specifically, this example illustrates a process for initiating a call between an initiating user agent and a terminating user agent of endpoint. As illustrated here, initiating the call can begin with receiving 305, at the reconstruction server for a user agent, a SIP INVITE message from the user agent, e.g., when the initiating user agent places the call. The reconstruction server for the user agent can add 310 an identifier for the reconstruction anchor to a header of the SIP INVITE message. For example, the reconstruction server can add a URI or other indication of a location of the relocation anchor for the initiating agent that provides a point though which signaling and reconstruction can occur. The reconstruction server for the user agent can then forward 315 the SIP INVITE message to the terminating endpoint.

The reconstruction server for the terminating endpoint can receive 320 the SIP INVITE message from the reconstruction server for the user agent, store 325 the identifier for the reconstruction anchor for the user agent from the header of the INVITE message, and associate 330 the stored identifier for the reconstruction anchor for the user agent with the call. As will be seen, this stored identifier will be used by signaling processes to direct messages back to the reconstructions anchor for the user agent. The reconstruction server for the terminating endpoint can then forward 335 the SIP INVITE message to the terminating endpoint and receive 340, in response, a SIP 200OK message from the terminating endpoint. The reconstruction server for the terminating endpoint can add 345 the identifier for the reconstruction anchor for the terminating endpoint to the header of the SIP 200 OK message and forward 350 the SIP 200 OK message to the reconstruction anchor for the user agent.

The reconstruction server for the user agent can receive 355, at the reconstruction anchor for the user agent, the SIP 200 OK message from the reconstruction server for the terminating endpoint including the identifier for the reconstruction anchor for the terminating endpoint in the header of the SIP 200 OK message. The reconstruction server for the user agent can store 360 the identifier for the reconstruction anchor for the terminating endpoint and associate 365 the stored identifier for the reconstruction anchor for the terminating endpoint with the call. The reconstruction server for the user agent can then forward 370 the SIP 200 OK message to the user agent and the call can proceed as usual. At some point during the call, if a server involved in the dialog should restart, the stored anchor identifiers associated with the call can be used to reconstruct the dialog without specialized processing by user agents or endpoints involved.

Figure 4:
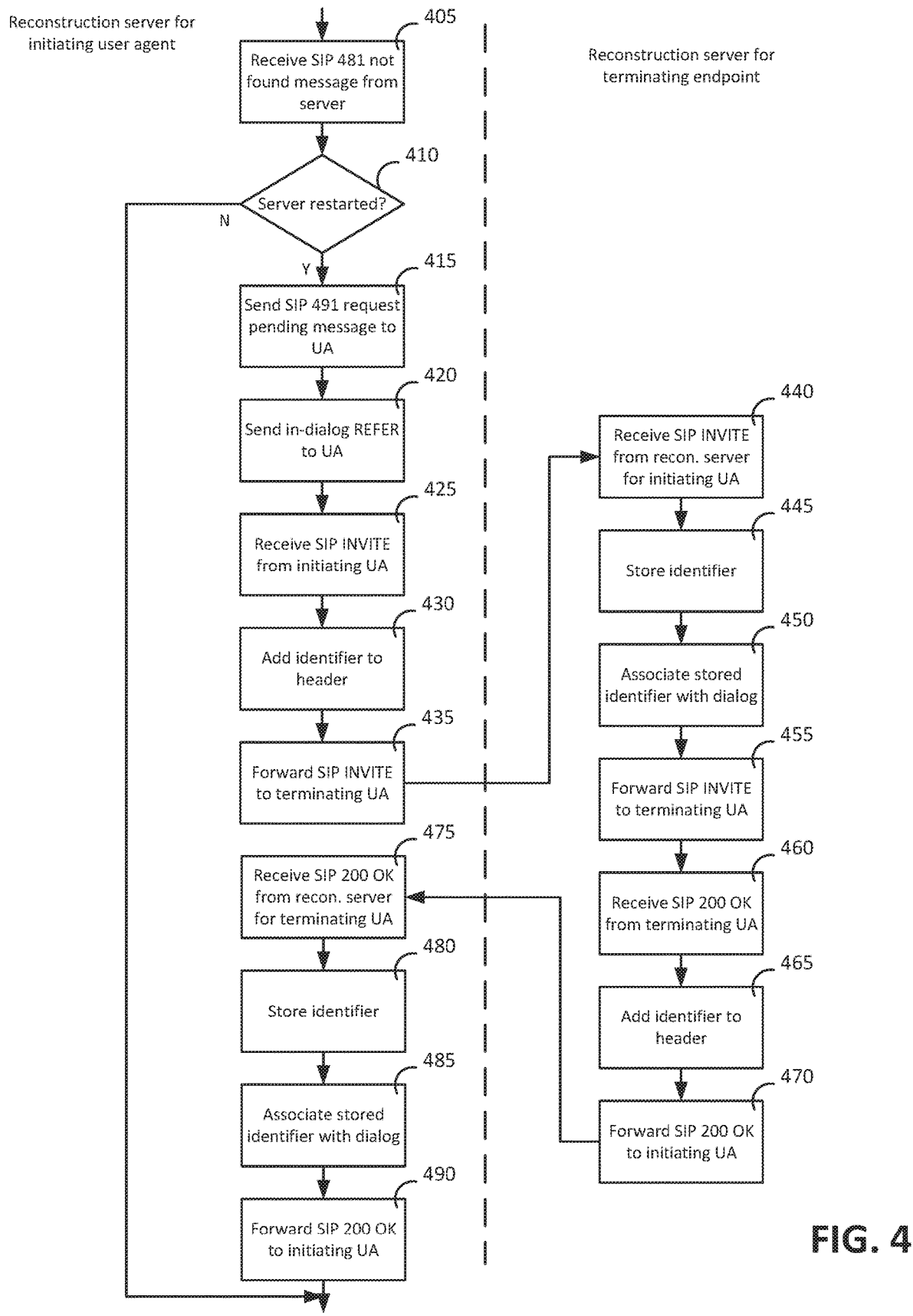
FIG. 4 is a flowchart illustrating additional details of an exemplary process for reconstructing a dialog using reconstruction anchors between user agents according to one embodiment.

FIG. 4 is a flowchart illustrating additional details of an exemplary process for reconstructing a dialog using reconstruction anchors between user agents according to one embodiment. Once established and as the dialog is conducted, the reconstruction server for the user agent can receive 405 a SIP 481 NOT FOUND message from the server providing one or more features to the SIP dialog. As noted, this can occur due to the server being unavailable and/or having just restarted and thus, having lost call information in the restart, being unaware of the dialog. If 410 the server providing one or more features to the SIP dialog fails to restart, perhaps after a brief timeout period expires, the call may fail.

However, if 410 the server providing one or more features to the SIP dialog restarts 410, the reconstruction server for the user agent can send 415 a SIP 491 REQUEST PENDING message to the user agent. The reconstruction server for the user agent can also send 420 a SIP in-dialog REFER message to the user agent. As expected, this will cause the user agent to respond with a SIP INVITE for a new dialog. In other words, the reconstruction server can initiate the new SIP dialog via the reconstruction anchor for the user agent and the reconstruction anchor for the terminating endpoint. The new dialog can then be used to replace the original SIP dialog. The reconstruction server for the user agent can receive 425 the INVITE for the new dialog from the user agent, add 430 the identifier for the reconstruction anchor to a header of the SIP INVITE message for the new dialog, and forward 435 the SIP INVITE message for the new dialog to the reconstruction anchor for the terminating endpoint.

The reconstruction server for the terminating endpoint can receive 440 the SIP INVITE message for the new dialog from the reconstruction server for the user agent, store 445 the identifier for the reconstruction anchor for the user agent, associate 450 the stored identifier for the reconstruction anchor for the user agent with the new dialog, and forward 455 the SIP INVITE message for the new dialog to the terminating endpoint. In response, the reconstruction server for the terminating endpoint can receive 460 a SIP 200OK message for the new dialog from the terminating endpoint, add 465 the identifier for the reconstruction anchor for the terminating endpoint to the header of the SIP 200 OK message for the new dialog, and forward 470 the SIP 200 OK message for the new dialog to the reconstruction anchor for the user agent.

The reconstruction server for the user agent can receive 475 the SIP 200 OK message for the new dialog comprising the identifier for the reconstruction anchor for the terminating endpoint in the header of the SIP 200 OK message for the new dialog, store 480 the identifier for the reconstruction anchor for the terminating endpoint, associate 485 the stored identifier for the reconstruction anchor for the terminating endpoint with the call, and forward 490 the SIP 200 OK message for the new dialog to the user agent. In this way, the new dialog can be started and can replace the original dialog and the sequencing of the dialog can be maintained between the original dialog and the new dialog. The original dialog can then be closed. Since the restarted server is now aware of this dialog, the requested feature can now be provided in the new dialog.

Figure 5:
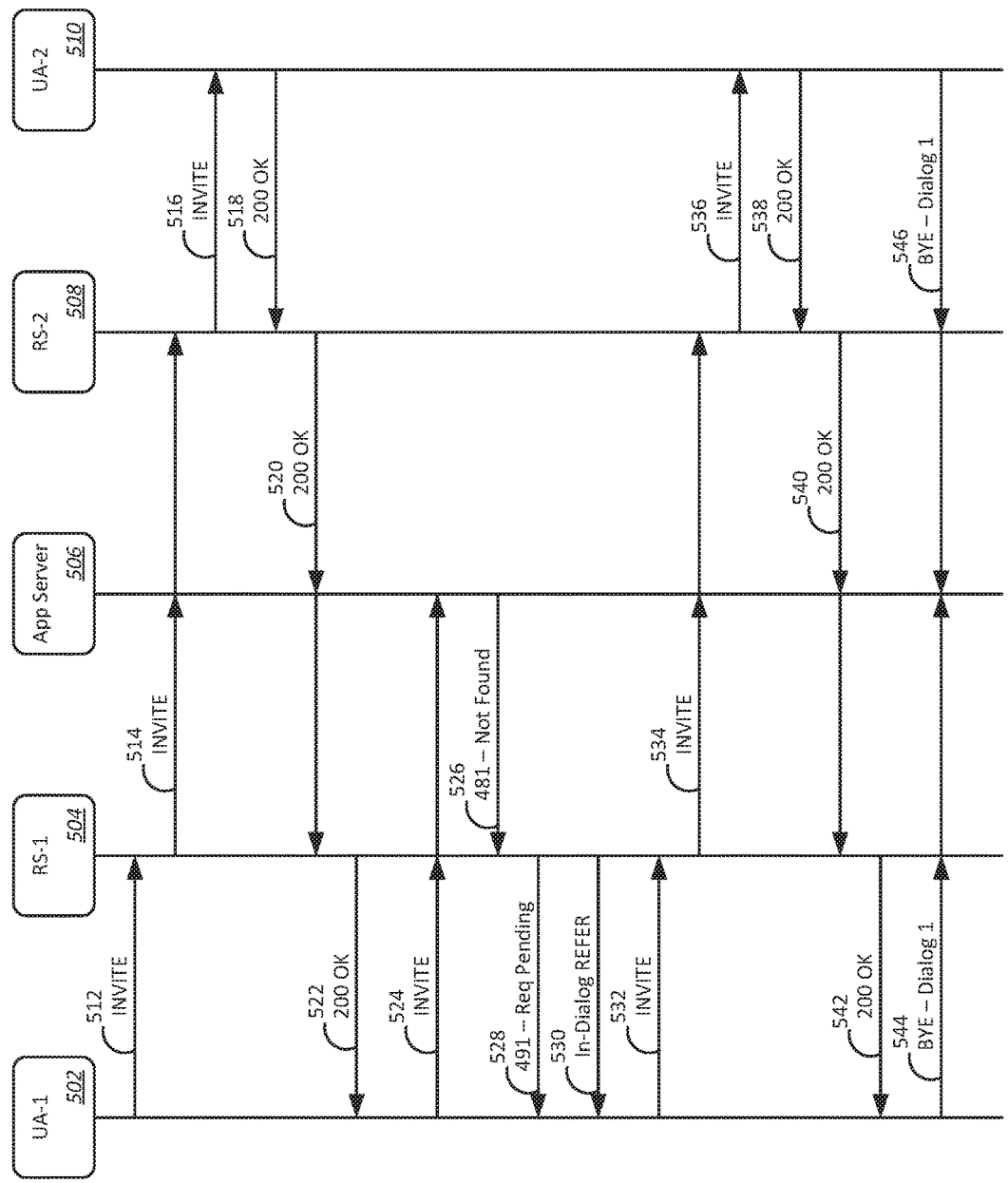
FIG. 5 is a fencepost diagram illustrating one example of signaling between elements of a system utilizing reconstruction anchors to reconstruct a dialog according to one embodiment.

FIG. 5 is a fencepost diagram illustrating one example of signaling between elements of a system utilizing reconstruction anchors to reconstruct a dialog according to one embodiment. More specifically, this example illustrates an exchange of signaling messages between elements of a system to initiate and then reconstruct a dialog. The elements involved here include a first user agent (UA-1) 502 which initiates a call and will therefore also be referred to here as the initiating UA. The elements also include a reconstruction server (RS-1) 504 associated with the initiating UA 502, an application server 506 providing one or more features in the call, a reconstruction server 508 associated with a second user agent (UA-2) 510 to which the call is being made and which will also be referred to here as the terminating UA or endpoint. It should be noted that, while illustrated here as separate for the sake of clarity, the reconstruction server 504 associated with the initiating UA 502 and the reconstruction server 508 associated with the terminating UA 510 may, depending upon the exact implementation, be the same or different physical and/or virtual equipment or machine. Similarly, the application server 506 may, in some cases, be physically or virtually implemented as part of or co-located with either or both of the reconstruction servers 504 and/or 508. Also, it should be understood that while only one application server 506 is shown here for the sake of simplicity and clarity, any number of application servers or additional elements may be included in various implementations. Other variations on the arrangement and/or composition of the elements involved in initiating and reconstructing a session are contemplated and considered to be within the scope of the present disclosure.

To initiate the call, the initiating UA 502 can generate and send a SIP INVITE message 512. The reconstruction server 504 for the initiating UA 502 can receive the SIP INVITE message 512 and, as described, can add an identifier a header of the message. For example, the reconstruction server 504 can add a URI or other indication referring to a location of the relocation anchor implemented by the reconstruction server 504 for the initiating UA 502 that provides a point though which subsequent signaling and reconstruction can occur. The reconstruction server 504 for the initiating UA 502 can then forward the modified SIP INVITE message 514 to the other elements of the system including the application server 506 and reconstruction server for the terminating UA 510.

The reconstruction server 508 for the terminating UA 510 can receive the SIP INVITE message 514 from the reconstruction server 504 for the initiating UA 502. As described, the reconstruction server 508 can store the identifier for the reconstruction anchor for the initiating UA 502 from the header of the INVITE message 514 and associate the stored identifier with the call. The reconstruction server 508 for the terminating UA 510 can then forward the SIP INVITE message 516 to the terminating UA 510 and receive, in response, a SIP 200OK message 518 from the terminating UA 510. The reconstruction server 508 for the terminating UA 510 can add a URI or other indication referring to a location of the relocation anchor implemented by the reconstruction server 508 for the terminating UA 510 to the header of the SIP 200 OK message 518 and forward the modified SIP 200 OK message 520 to the reconstruction anchor implemented by the reconstruction server 504 for the initiating UA 502.

The reconstruction server 504 for the initiating UA 502 can receive the SIP 200 OK message 520 from the reconstruction server 508 for the terminating UA 510 including the identifier for the reconstruction anchor for the terminating UA 510 in the header of the message. The reconstruction server 504 for the initiating UA 502 can store the identifier and associate the stored identifier with the call. The reconstruction server 504 for the initiating UA 502 can then forward the SIP 200 OK message 522 to the initiating UA 502 and the call can proceed as usual.

Once established and at some point during the call, the initiating UA 502 may request a feature provided by the application server 506 such as call forwarding, call conferencing, hold, etc. To invoke this feature, the initiating UA 502 can send a SIP INVITE message 524 to the application server 506. However, if the application server 506 has restarted since the call was initiated, it may have lost the call information and therefore may not recognize the request. In that case, the application server 506 responds with a SIP 481 NOT FOUND message 526.

The reconstruction server 504 for the initiating UA 502 can receive the SIP 481 NOT FOUND message 526 from the application server 506 and, in turn, send a SIP 491 REQUEST PENDING message 528 to the initiating UA 502. After restart of the application server 506, the reconstruction server 504 for the initiating UA 502 can also send a SIP in-dialog REFER message 530 to the initiating UA 502. This will cause the initiating UA 502 to respond with a SIP INVITE message 532 for a new dialog. In other words, the reconstruction server 504 can cause initiation of a new SIP dialog, via the reconstruction anchor for the user agents, which can then be used to replace the original SIP dialog. The reconstruction server 504 for the initiating UA 502 can receive the INVITE message 532 for the new dialog, add the identifier for the reconstruction anchor to a header of the message, and forward the modified SIP INVITE message 534 for the new dialog to the reconstruction anchor provided by the reconstruction server 508 for the terminating UA 510.

The reconstruction server 508 for the terminating UA 510 can receive the SIP INVITE message 534 for the new dialog, store the identifier for the reconstruction anchor for the initiating UA 502, associate the stored identifier with the new dialog, and forward the SIP INVITE message 536 for the new dialog to the terminating UA 510. In response, the reconstruction server 508 can receive a SIP 200OK message 538 for the new dialog from the terminating UA 510, add the identifier for the reconstruction anchor for the terminating UA 510 to the header of the message, and forward the modified SIP 200 OK message 540 to the reconstruction anchor provided by the reconstruction server 502 for the initiating UA 502.

The reconstruction server 502 for the initiating UA 502 can receive the SIP 200 OK message 540 for the new dialog with the identifier for the reconstruction anchor in the header, store the identifier, associate the stored identifier with the call, and forward the SIP 200 OK message 542 for the new dialog to the initiating UA 502. The new dialog can be started and can replace the original dialog and the original dialog can then be closed. Therefore, both the initiating UA 502 and terminating UA 510 can close the original dialog by sending SIP BYE messages 544 and 546 in the original dialog. In this way, the sequencing of the dialog can be maintained between the original dialog and the new dialog.

Figure 6:
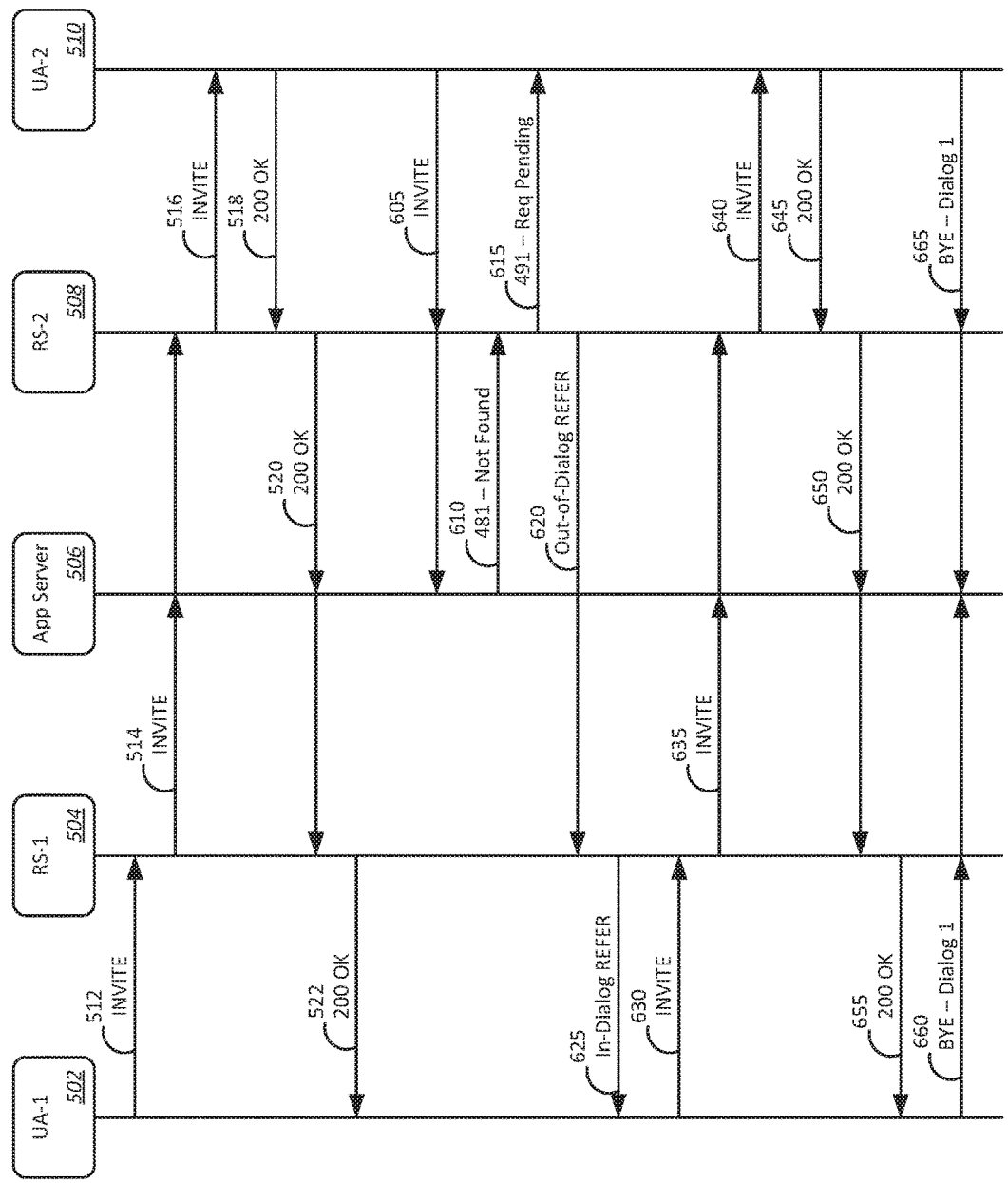
FIG. 6 is a fencepost diagram illustrating another example of signaling between elements of a system utilizing reconstruction anchors to reconstruct a dialog according to another embodiment.

FIG. 6 is a fencepost diagram illustrating another example of signaling between elements of a system utilizing reconstruction anchors to reconstruct a dialog according to another embodiment. This example includes the same elements, namely the initiating UA 502, reconstruction server 504 for the initiating UA 502, application server 506, reconstruction server 508 for the terminating UA 508 and the terminating UA 510 as illustrated in FIG. 5 and described above. As described above with reference to FIG. 5, a call can be initiated between these elements by exchanging SIP INVITE messages 512, 514, and 516 and SIP 200 OK messages 518, 520, and 522 through which identifiers for reconstruction anchors provided by the reconstruction servers 504 and 506 for the UAs 502 and 510 can be exchanged. However, in this example, detection of restart of the application server 506 and initiation of reconstruction are performed by the terminating UA 510 and reconstruction server 508 because of a new request originating from UA 510 instead of by the initiating UA 502 and reconstruction server 504 as was the case in FIG. 5.

More specifically, in this case, terminating UA 510 may request a feature provided by the application server 506. To invoke this feature, the terminating UA 510 can send a SIP INVITE message 605 to the application server 506. However, if the application server 506 has restarted since the call was initiated, it may have lost the call information and therefore may not recognize the request. In that case, the application server 506 responds with a SIP 481 NOT FOUND message 610.

The reconstruction server 508 for the terminating UA 510 can receive the SIP 481 NOT FOUND message 610 from the application server 506 and, in turn, send a SIP 491 REQUEST PENDING message 516 to the terminating UA 510. After restart of the application server 506, the reconstruction server 508 for the terminating endpoint 510 can also send an out-of-dialog SIP REFER message 620 to the reconstruction anchor provided by the reconstruction server 504 for the initiating UA 502.

The reconstruction server 504 for the initiating UA 502 can receive, at the reconstruction anchor, the out-of-dialog SIP REFER message 620 and in turn send a SIP in-dialog REFER message 625 to the initiating UA 502. This will cause the initiating UA 502 to respond with a SIP INVITE message 630 for a new dialog. The reconstruction server 504 for the initiating UA 502 can receive the INVITE message 630 for the new dialog, add the identifier for the reconstruction anchor to a header of the message, and forward the modified SIP INVITE message 635 for the new dialog to the reconstruction anchor provided by the reconstruction server 508 for the terminating UA 510.

The reconstruction server 508 for the terminating UA 510 can receive the SIP INVITE message 635 for the new dialog, store the identifier for the reconstruction anchor for the initiating UA 502, associate the stored identifier with the new dialog, and forward the SIP INVITE message 640 for the new dialog to the terminating UA 510. In response, the reconstruction server 508 can receive a SIP 200OK message 645 for the new dialog from the terminating UA 510, add the identifier for the reconstruction anchor for the terminating UA 510 to the header of the message, and forward the modified SIP 200 OK message 650 to the reconstruction anchor provided by the reconstruction server 502 for the initiating UA 502.

The reconstruction server 502 for the initiating UA 502 can receive the SIP 200 OK message 650 for the new dialog with the identifier for the reconstruction anchor in the header, store the identifier, associate the stored identifier with the call, and forward the SIP 200 OK message 655 for the new dialog to the initiating UA 502. In this way, the new dialog can be started and can replace the original dialog and the original dialog can then be closed. Therefore, both the initiating UA 502 and terminating UA 510 can close the original dialog by sending SIP BYE messages 660 and 665 in the original dialog. In this way, the sequencing of the dialog can be maintained between the original dialog and the new dialog.

Figure 7:
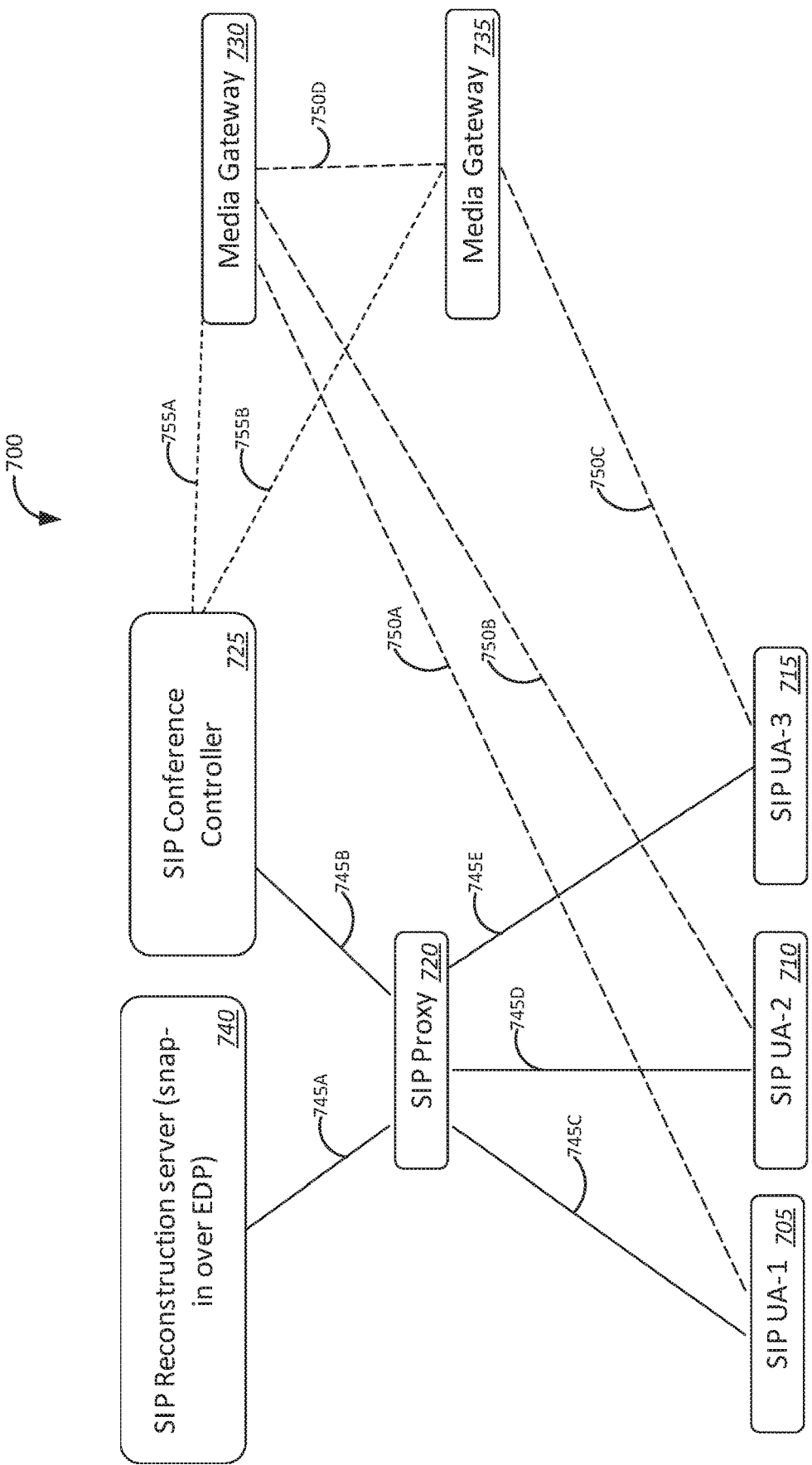
FIG. 7 is a block diagram illustrating elements of a system for reconstructing SIP conferences using reconstruction anchors for user agents in the conference according to one embodiment.

FIG. 7 is a block diagram illustrating elements of a system for reconstructing SIP conferences using reconstruction anchors for user agents in the conference according to one embodiment. As illustrated in this example, the system 700 can comprise a number of user agents 705, 710, and 715. The user agents 705, 710, and 715 can be any hardware/software that can process SIP communications such as a SIP telephone application, a SIP Instant Messaging (IM) application, a SIP video conference application, a SIP email application, a SIP softphone in a PC, a SIP application in a set-top box, and the like. The user agents 705, 710, and 715 may be implemented in any of a variety of communication devices including but not limited to a telephone, a Personal Computer (PC), a tablet device, a cellular telephone, a Personal Digital Assistant (PDA), a television, a set-top box, a FAX machine, a pager, and others. It should be noted and understood that any number of user agents 705, 710, and 715 may be used with various embodiments described herein.

The system 700 can include a SIP proxy 720. As known in the art, the SIP proxy 720 may be implemented by or as part of a SIP server (not shown here) which can comprise any hardware/software that can process communications, such as a network server, a Private Branch Exchange (PBX), a Session Manager, a communication system, a router, a central exchange, and/or others. The user agents 705, 710, and 715 can be coupled with the SIP proxy 720 and each other via one or more communication networks (not shown here) as known in the art such as the Internet, a Wide Area Network (WAN), a Local Area Network (LAN), the Public Switched Telephone Network (PSTN), a packet switched network, a circuit switched network, a cellular network, any combination of these, and the like. The network can use a variety of protocols, such as Ethernet, Internet Protocol (IP), Session Initiation Protocol (SIP), Asynchronous Transfer Mode (ATM), Integrated Services Digital Network (ISDN), H.323, and the like. The SIP proxy 720 can establish a SIP session dialog between the user agents 705, 710, and 715 using standard SIP processes. For example, the user agents 705, 710, and 715 may participate in a video conference or a voice conference.

The system 700 can also comprise a SIP conference controller 725 and one or more media gateways 730 and 735. As known in the art, the SIP conference controller 725 can manage or otherwise facilitate the conference. The SIP conference controller 725 may communicate with the media gateways 730 and 735 using a media signaling 755A and 755B, such as, but not limited to H.248/MEGACO and media server markup language (MSML). The media gateways 730 and 735 may comprise one or more platforms for executing real-time media processing tasks. For example, the media gateway 132 may be capable of processing audio and video, alone, or in any combination. The media gateways 730 and 735 may play audio/video messages and perform other Interactive Voice Response (IVR) functions, or may perform media conferencing, for example, by providing media to one or more network elements in accordance with one or more protocols, such as Real-time Transport Protocol and/or the RTP Control Protocol (RTCP) over one or more media paths 750A, 750B, 750C, and 750D. Additionally or alternatively, the media gateways 730 and 735 may be responsible for converting media provided in one type of network to the format required in another type of network and for communicating with each of the SIP UAs 705, 710, and 715. In some embodiments, media gateways 730 and 735 may be connected by an Inner Gateway Connection 750D.

The system 700 can also include a reconstruction server 740 which may comprise any of a variety of physical and/or virtual machines. It should be noted that, while illustrated here as a separate element from the SIP proxy 720 and SIP conference controller 725 for the sake of clarity, the reconstruction server 740 may, in some implementations, be implemented as part of or collocated with the same physical and/or virtual machines providing the SIP proxy 720 and/or conference controller 725. During the session dialog, the reconstruction server 740 and conference controller 725 can exchange SIP signaling messages 745A and 745B with the proxy server 720 via one or more of the communication networks described above. Similarly, the SIP proxy 720 can exchange SIP signaling messages 745C, 745D, and 745E with the user agents 705, 710, and 715.

Once a SIP dialog between one or more SIP UAs 705, 710, and 715 and/or the SIP conference controller 725 is established, a media session may be directly established between the SIP UAs 108 whereby media may be delivered via the media gateways 730 and 735. For example, a voice or video media stream may be established between SIP UAs 705, 710, and 715 and the media gateways 730 and 735 using Real Time Protocol (RTP). At some point, the SIP conference controller 725 may experience one or more outages or catastrophic events such that the SIP conference controller 725 restarts. This may be for various reasons, such as, a hardware failure, a software failure, a firmware failure, a power failure, a network failure, and/or the like. As a result, all call dialog information that once resided on the SIP conference controller 725 is lost.

Once the SIP conference controller 725 comes back online after experiencing such an event, the one or more media gateways 730 and 735 can register back to the SIP conference controller 725, providing the SIP conference controller 120 the necessary call context information for all calls that are utilizing the media gateways 730 and 735. However, although the media path between the SIP UAs 705, 710, and 715 and the media gateways 730 and 735, and thus the conference call, may be maintained, the call dialog is not re-established. That is, the call dialog may stay in a preservation mode. Accordingly, features such as adding a new participant, transferring participants, and placing participants on hold are no longer available and will not work even though the media path, and thus the conference call, appear to conference participants as if the system 700 has not been impacted by the failure.

Generally speaking, the reconstruction server 740 can provide a reconstruction anchor for each of the user agents 750, 710, and 715 in the conference. These reconstruction anchors can allow for the reconstruction of the dialog in the event of a restart of the conference controller 725. Through these anchors, the reconstruction server 740 handles the signaling required to reconstruct the session once the conference controller 725 has restarted by establishing a new dialog that can replace the original dialog while continuing the session. Since the reconstruction server 740 handles processing and control of the signaling through the reconstruction anchors for each user agent 705, 710, 715, the user agents 705, 710, 715 are not required to perform or be adapted to handle any special processing other than the standard handling of SIP messages. Additional details of the processes for using such reconstruction anchors will now be described with reference to FIGS. 8-10.

Figure 8:
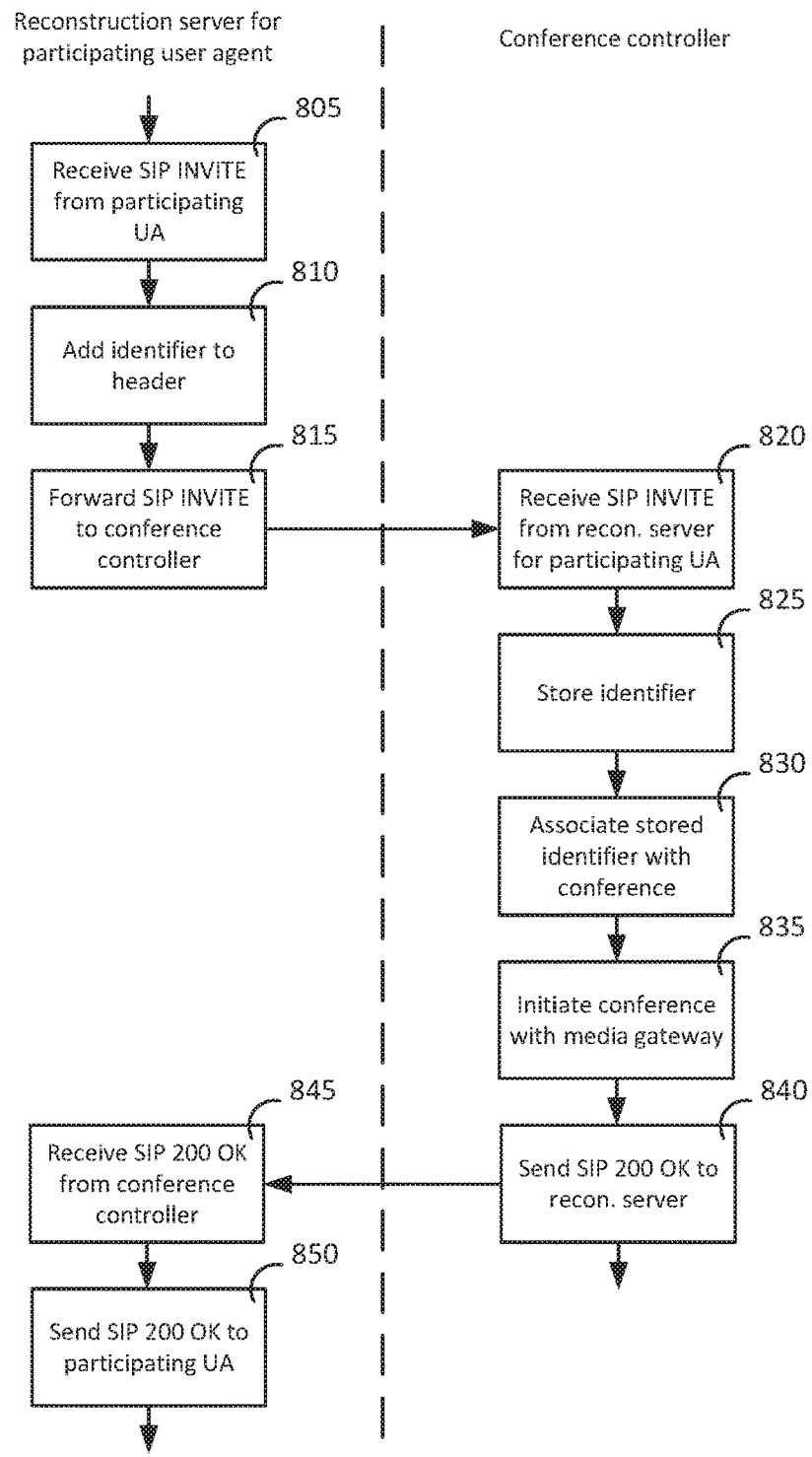
FIG. 8 is a flowchart illustrating additional details of an exemplary process for initiating a conference using reconstruction anchors between user agents according to one embodiment.

FIG. 8 is a flowchart illustrating additional details of an exemplary process for initiating a conference using reconstruction anchors between user agents according to one embodiment. In this example, initiating a conference can begin with receiving 805, by a reconstruction server, a SIP INVITE message from a user agent requesting to participate in the conference. The reconstruction server for the user agent can add 810 an identifier for the reconstruction anchor to a header of the SIP INVITE message and forward 815 the SIP INVITE message to the conference controller.

The conference controller can receive 820 the SIP INVITE message from the reconstruction server, store 825 the identifier for the reconstruction anchor for the user agent, and associate 830 the stored identifier with the conference. The conference controller can then initiate 835 the conference with a media gateway and, once the conference is initiated, send 840 a SIP 200 OK message to the reconstruction anchor provided by the reconstruction server for the user agent.

The reconstruction server for the user agent can receive 845 the SIP 200 OK message from the conference controller and forward 850 the SIP 200 OK message to the user agent. At some point during the conference, if the conference controller or a server involved in the dialog should restart, the stored anchor identifiers associated with the conference can be used to reconstruct the dialog without specialized processing by user agents or endpoints involved.

Figure 9:
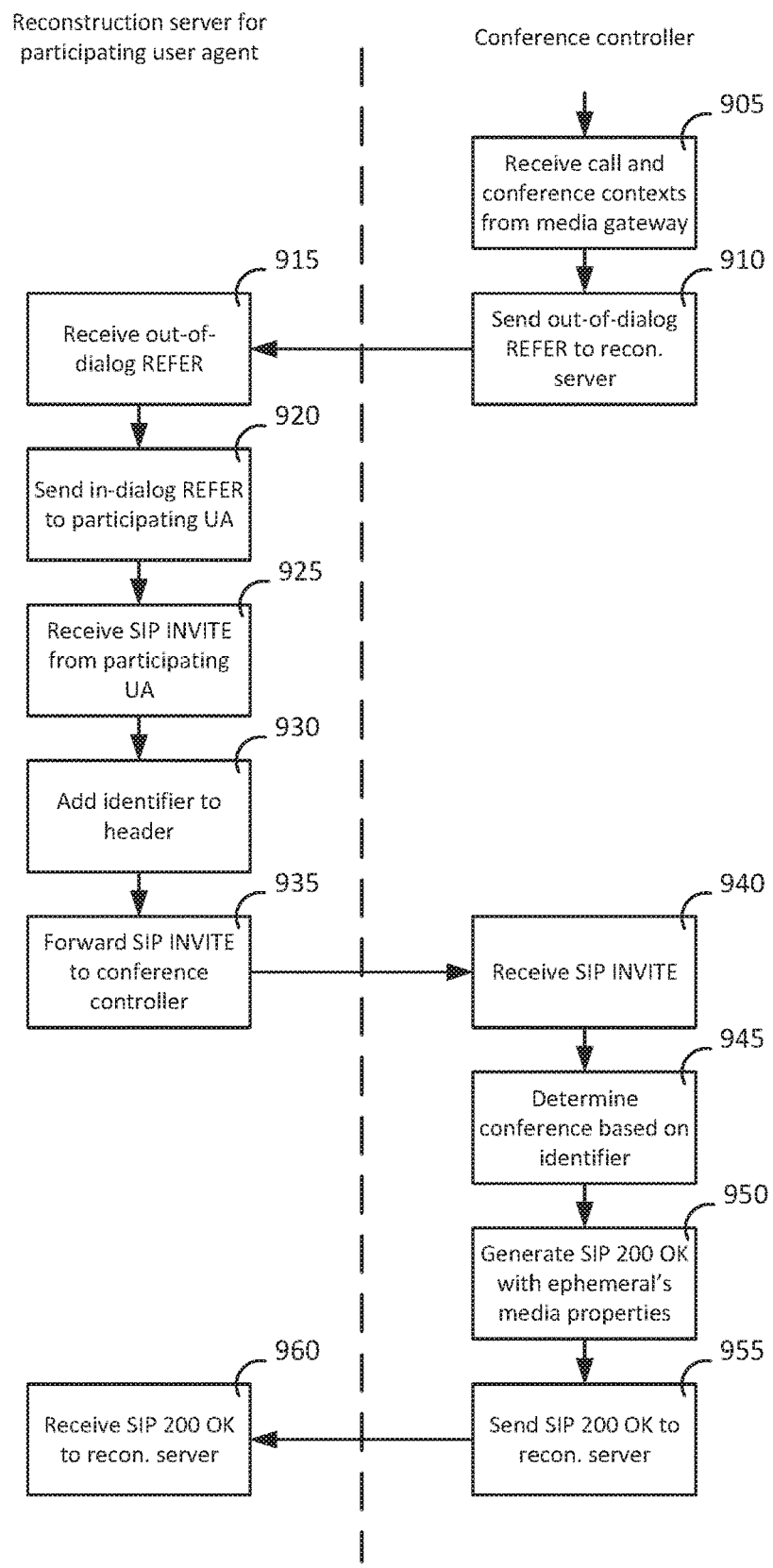
FIG. 9 is a flowchart illustrating additional details of an exemplary process for reconstructing a conference using reconstruction anchors between user agents according to one embodiment.

FIG. 9 is a flowchart illustrating additional details of an exemplary process for reconstructing a conference using reconstruction anchors between user agents according to one embodiment. As illustrated in this example, once it has restarted, the conference controller can receive 905 conference context from the media gateway. The conference controller can then send 910 an out-of-dialog SIP REFER message to the reconstruction server for the user agent.

The reconstruction server for the user agent can receive 915 the out-of-dialog SIP REFER message from the conference controller and send 920 an in-dialog SIP REFER message to the user agent. As expected, this will cause the user agent to respond with a SIP INVITE for a new dialog. In other words, the conference controller and reconstruction server can initiate the new SIP dialog via the reconstruction anchor for the user agent. The new dialog can then be used to replace the original SIP dialog. The reconstruction server for the user agent can receive 925 a SIP INVITE for a new dialog from the user agent, add 930 the identifier for the reconstruction anchor to a header of the SIP INVITE message for the new dialog, and forward 935 the SIP INVITE message for the new dialog to the conference controller.

The conference controller can receive 940 the SIP INVITE message from the reconstruction server for the user agent and determine 945 the conference identifier based on the identifier for the reconstruction anchor in the SIP INVITE message. The conference controller can generate 950 a SIP 200 OK message comprising ephemeral media properties received by the conference controller from a media gateway and send 955 the SIP 200 OK message to the reconstruction anchor for the user agent.

The reconstruction server for the user agent can receive 960 the SIP 200 OK message for the new dialog from the conference controller at the reconstruction anchor for the user agent. In this way, the new dialog can be started and can replace the original dialog. The original dialog can then be closed.

Figure 10:
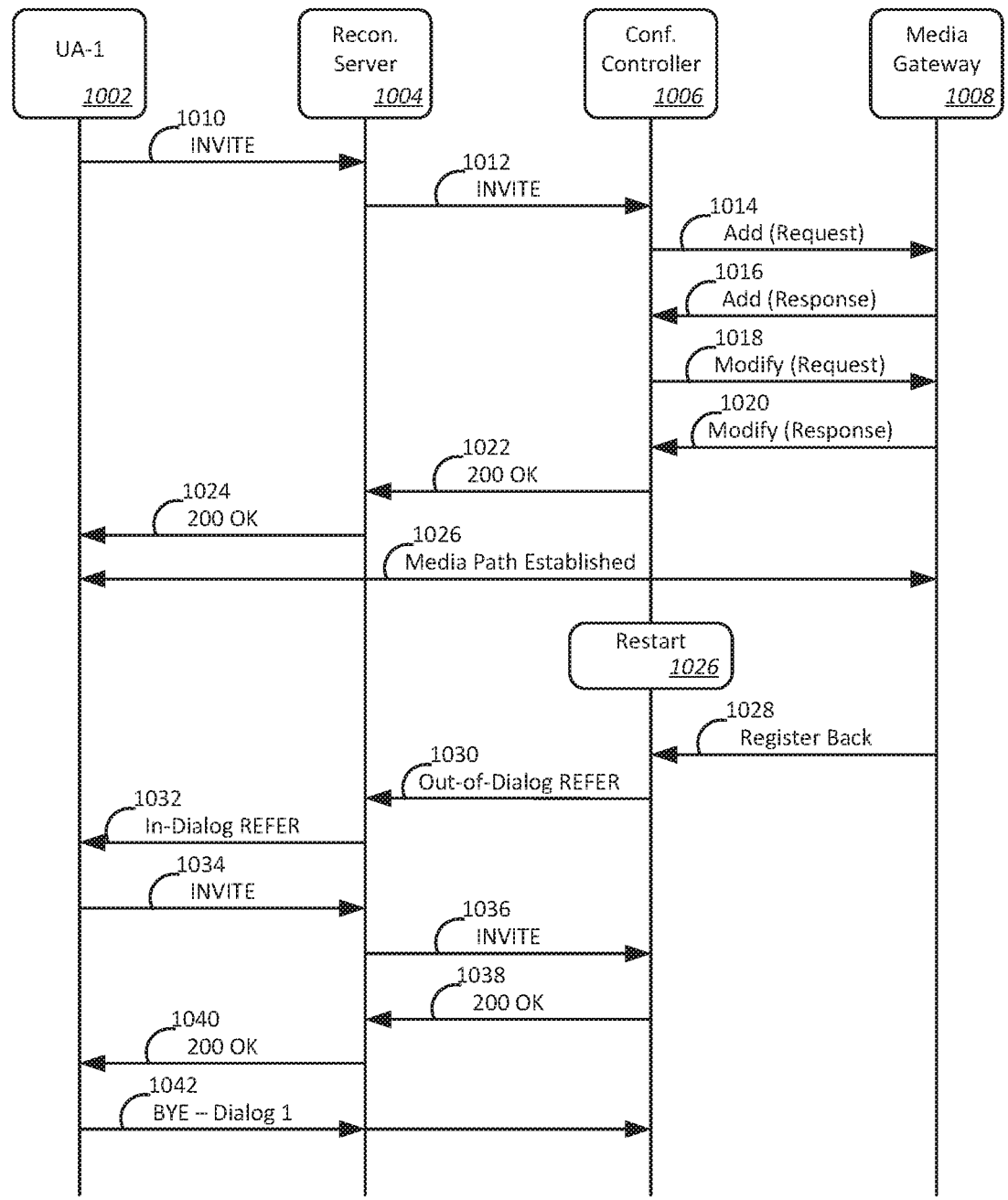
FIG. 10 is a fencepost diagram illustrating exemplary signaling between elements of a system utilizing reconstruction anchors to reconstruct a conference according to one embodiment.

FIG. 10 is a fencepost diagram illustrating exemplary signaling between elements of a system utilizing reconstruction anchors to reconstruct a conference according to one embodiment. More specifically, this example illustrates an exchange of signaling messages between elements of a system to initiate and then reconstruct a conference. The elements involved here include a first user agent (UA-1) 1002 which joins a conference and will therefore also be referred to here as the participating UA. The elements also include a reconstruction server 1004 associated with the participating UA 1002, a conference controller 1006 providing conference functionality to participating UAs, and a media gateway 1008. It should be noted that, while illustrated here as separate for the sake of clarity, the reconstruction server 1004 associated with the initiating UA 1002 and the conference controller 1006 may, depending upon the exact implementation, be the same or different physical and/or virtual equipment or machine. Similarly, the conference controller 1006 may, in some cases, be physically or virtually implemented as part of or co-located with the media gateway 1008. Also, it should be understood that while only one participating user agent 1002 is shown here for the sake of simplicity and clarity, any number of participating UAs may join a given conference. In such a case, the joining and reconstruction of the conference with each of the participating UAs follow the same processes and use the same signaling as illustrated and described here for the single participating UA 1002. Other variations on the arrangement and/or composition of the elements involved in initiating and reconstructing a session are contemplated and considered to be within the scope of the present disclosure.

To join the conference, the participating UA 1002 can generate and send a SIP INVITE message 1010. The reconstruction server 1004 for the participating UA 1002 can receive the SIP INVITE message 1010 and, as described, can add an identifier a header of the message. For example, the reconstruction server 1004 can add a URI or other indication referring to a location of the relocation anchor implemented by the reconstruction server 1004 for the participating UA 1002 that provides a point though which subsequent signaling and reconstruction can occur. The reconstruction server 1004 can then send the modified SIP INVITE message 1012 to the conference controller.

The conference controller 1006 can receive the SIP INVITE message 1012 from the reconstruction server, store the identifier for the reconstruction anchor for the user agent 1002, and associate the stored identifier with the conference. The conference controller 1006 can then initiate the conference with a media gateway 1008. Initiating the conference can include, for example, exchanging add request 1014, add response, modify request 1018, and modify response messages 1020 as known in the art. It should also be noted that, while not illustrated here for the sake of brevity and clarity, a similar process can be performed to initiate the conference with a media server using, for example, Media Server Markup Language (MSML) protocol. Once the conference is initiated, the conference controller can send a SIP 200 OK message 1022 to the reconstruction anchor provided by the reconstruction server 1004 for the participating user agent 1002.

The reconstruction server 1004 for the participating user agent 1002 can receive the SIP 200 OK message 1022 from the conference controller 1006 and forward the SIP 200 OK message 1024 to the participating user agent 1002. At this point, a media path 1026 has been established between the participating user agent 1002 and the media gateway 1008. As known in the art, the conference can then be conducted with the participating user agent 1002, conference controller 1006 and media gateway 1008 until such time as the conference needs to be reconstructed due to the conference controller 1006, media gateway 1008, or other server supporting the conference restarts.

When the conference controller or a server involved in the dialog restarts 1026, the stored anchor identifiers for the participating user agent 1002 conference can be used to reconstruct the dialog without specialized processing by user agents or endpoints involved. More specifically, once it has restarted 1026, the conference controller 1006 can receive conference context from the media gateway via a register back 1028. The conference controller 1006 can then send an out-of-dialog SIP REFER message 1030 to the reconstruction server 1004 for the participating user agent 1002.

The reconstruction server 1004 for the participating user agent 1002 can receive 915 the out-of-dialog SIP REFER message 1030 from the conference controller 1006 and send an in-dialog SIP REFER message 1032 to the participating user agent 1002. This will cause the participating user agent 1002 to respond with a SIP INVITE message 1034 for a new dialog. In other words, the conference controller 1006 and reconstruction server 1004 can initiate the new SIP dialog via the reconstruction anchor for the participating user agent 1002. The new dialog can then be used to replace the original SIP dialog. The reconstruction server 1004 for the user agent 1002 can receive the SIP INVITE message 1034 for a new dialog from the user agent, add the identifier for the reconstruction anchor to a header of the message, and forward the modified message 1036 to the conference controller 1006.

The conference controller 1006 can receive the SIP INVITE message 1036 from the reconstruction server 1004 for the participating user agent 1002 and determine the conference identifier based on the identifier for the reconstruction anchor in the SIP INVITE message 1036. The conference controller 1006 can generate a SIP 200 OK message comprising ephemeral media properties received by the conference controller 1006 from the media gateway 1008 and send the SIP 200 OK message 1038 to the reconstruction anchor maintained by the reconstruction server 1004 for the participating user agent 1002.

The reconstruction server 1004 for the user agent 1002 can receive the SIP 200 OK message 1038 for the new dialog from the conference controller 1006 at the reconstruction anchor for the user agent and forward the SIP 200 OK message 1040 to the participating user agent 1002 to complete establishment of the new dialog. In this way, the new dialog can be started and can replace the original dialog. The original dialog can then be closed by the participating user agent 1002 sending a SIP BYE message 1042 in the original dialog.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a communication network; and
    a reconstruction server coupled with the communication network, the reconstruction server comprising a processor and a memory, the memory comprising a set of instructions stored therein which, when executed by the processor, causes the processor to:
        initiate a Session Initiation Protocol (SIP) dialog with a user agent on the communication network, wherein the user agent participates in the SIP dialog with a terminating endpoint on the communication network and a server providing one or more features to the SIP dialog, and wherein the reconstruction server provides a reconstruction anchor for the user agent in the SIP dialog during initiation of a session by receiving a SIP INVITE message; adding an identifier for the reconstruction anchor for the user agent to a header of the SIP INVITE message, and forwarding the SIP INVITE message to the terminating endpoint;
        during the session, detect a restart of the server providing the one or more features to the SIP dialog; and
        reconstruct the SIP dialog between the server providing the one or more features and the user agent.

2. The system of claim 1, wherein the SIP dialog comprises a call between the user agent and the terminating endpoint.

3. The system of claim 2, wherein initiating the SIP dialog further comprises:
    receiving, at the reconstruction anchor for the user agent from a reconstruction server for the terminating endpoint, a SIP 200 OK message comprising an identifier for the reconstruction anchor for the terminating endpoint in a header of the SIP 200 OK message;

storing the identifier for the reconstruction anchor for the terminating endpoint;

associating the stored identifier for the reconstruction anchor for the terminating endpoint with the call; and forwarding the SIP 200 OK message to the user agent.

4. The system of claim 3, wherein the reconstruction server for the terminating endpoint receives the SIP INVITE message from the reconstruction server for the user agent, stores the identifier for the reconstruction anchor for the user agent, associates the stored identifier for the reconstruction anchor for the user agent with the call, forwards the SIP INVITE message to the terminating endpoint, receives the SIP 200 OK message from the terminating endpoint, adds the identifier for the reconstruction anchor for the terminating endpoint to the header of the SIP 200 OK message, and forwards the SIP 200 OK message to the reconstruction anchor for the user agent.

5. The system of claim 2, wherein reconstructing the SIP dialog comprises:

receiving a SIP 481 NOT FOUND message from the server providing the one or more features to the SIP dialog;

sending a SIP 491 REQUEST PENDING message to the user agent;

sending, after the restart of the server providing the one or more features to the SIP dialog, a SIP in-dialog REFER message to the user agent;

receiving a SIP INVITE for a new SIP dialog from the user agent;

initiating the new SIP dialog via the reconstruction anchor for the user agent and a reconstruction anchor for the terminating endpoint, the new SIP dialog replacing the original SIP dialog.

6. The system of claim 1, wherein the SIP dialog comprises a conference and the system further comprises a conference controller.

7. The system of claim 6, wherein initiating the SIP dialog comprises:

receiving the SIP INVITE message from the user agent;

adding the identifier for the reconstruction anchor for the user agent to the header of the SIP INVITE message;

forwarding the SIP INVITE message to the conference controller;

receiving, at the reconstruction anchor for the user agent from the conference controller, a SIP 200 OK message; and forwarding the SIP 200 OK message to the user agent.

8. The system of claim 7, wherein the conference controller receives the SIP INVITE message from the reconstruction server for the user agent, stores the identifier for the reconstruction anchor for the user agent, associates the stored identifier for the reconstruction anchor for the user agent with the conference, initiates the conference with a media gateway, and sends the SIP 200 OK message to the reconstruction anchor for the user agent.

9. The system of claim 8, wherein reconstructing the SIP dialog comprises:

receiving an out-of-dialog SIP REFER message from the conference controller following a restart of the conference controller;

sending an in-dialog SIP REFER message to the user agent;

receiving a SIP INVITE for a new SIP dialog from the user agent;

initiating the new SIP dialog via the reconstruction anchor for the user agent and the conference controller, the new SIP dialog replacing the original SIP dialog.

10. A method for reconstructing a communication session, the method comprising:

initiating, by a reconstruction server for a user agent, a Session Initiation Protocol (SIP) dialog with the user agent on a communication network, wherein the user agent participates in the SIP dialog with a terminating endpoint on the communication network and wherein the reconstruction server for the user agent provides a reconstruction anchor for the user agent in the SIP dialog by exchanging an identifier for the reconstruction anchor for the user agent via a SIP INVITE message;

detecting, by the reconstruction server for the user agent, a restart of a server providing one or more features to the SIP dialog; and reconstructing, by the reconstruction server for the user agent, the SIP dialog between the user agent and the terminating endpoint using the reconstruction anchor, wherein reconstructing the SIP dialog comprises:

receiving, by the reconstruction server for the user agent, a SIP 481 NOT FOUND message from the server providing the one or more features to the SIP dialog;

sending, by the reconstruction server for the user agent, a SIP 491 REQUEST PENDING message to the user agent;

sending, by the reconstruction server for the user agent after the restart of the server providing the one or more features to the SIP dialog, a SIP in-dialog REFER message to the user agent;

receiving, by the reconstruction server for the user agent, a SIP INVITE for a new SIP dialog from the user agent; and initiating, by the reconstruction server for the user agent, the new SIP dialog via the reconstruction anchor for the user agent and a reconstruction anchor for the terminating endpoint, the new SIP dialog replacing the original SIP dialog.

11. The method of claim 10, wherein the SIP dialog comprises a call between the user agent and the terminating endpoint and wherein initiating the SIP dialog comprises exchanging identifiers for the reconstruction anchors between the reconstruction servers via SIP INVITE and SIP OK messages.

12. The method of claim 11, wherein reconstructing the SIP dialog comprises:

receiving, by the reconstruction server for the terminating endpoint, a SIP 481 NOT FOUND message from the server providing the one or more features to the SIP dialog;

sending, by the reconstruction server for the terminating endpoint, a SIP 491 REQUEST PENDING message to the terminating endpoint;

sending, by the reconstruction server for the terminating endpoint, an out-of-dialog SIP REFER message to the reconstruction anchor for the user agent;

receiving, by the reconstruction server for user agent at the reconstruction anchor, the out-of-dialog SIP REFER message;

sending, by the reconstruction server for the user agent after the restart of the server providing the one or more features to the SIP dialog, a SIP in-dialog REFER message to the user agent;

receiving, by the reconstruction server for the user agent, a SIP INVITE for a new SIP dialog from the user agent; and initiating, by the reconstruction server for the user agent, the new SIP dialog via the reconstruction anchor for the user agent and the reconstruction anchor for the terminating endpoint, the new SIP dialog replacing the original SIP dialog.

13. The method of claim 10, wherein the SIP dialog comprises a conference and wherein initiating the SIP dialog comprises exchanging identifiers for the reconstruction anchors between the reconstruction servers via SIP INVITE and SIP OK messages.

14. The method of claim 13, wherein reconstructing the SIP dialog comprises:
   receiving, by the reconstruction server for the user agent, an out-of-dialog SIP REFER message from a conference controller following a restart of the conference controller;
   sending, by the reconstruction server for the user agent, an in-dialog SIP REFER message to the user agent;
   receiving, by the reconstruction server for the user agent, a SIP INVITE for a new SIP dialog from the user agent;
   initiating, by the reconstruction server for the user agent, the new SIP dialog via the reconstruction anchor for the user agent and the reconstruction anchor for the one or more other endpoints, the new SIP dialog replacing the original SIP dialog.

15. A computer-readable device comprising a set of instructions stored therein which, when executed by a processor, causes the processor to reconstruct a communication session by:
   initiating, by a reconstruction server for a user agent, a Session Initiation Protocol (SIP) dialog with the user agent on a communication network, wherein the user agent participates in the SIP dialog with a terminating endpoint and a server providing one or more features to the SIP dialog on the communication network and wherein the reconstruction server for the user agent provides a reconstruction anchor for the user agent in the SIP dialog during initiation of the communication session by receiving a SIP INVITE message; adding an identifier for the reconstruction anchor for the user agent to a header of the SIP INVITE message, and forwarding the SIP INVITE message to the terminating endpoint;
   detecting, by the reconstruction server for the user agent, a restart of the server providing the one or more features to the SIP dialog; and
   reconstructing, by the reconstruction server for the user agent, the SIP dialog between the user agent and the server providing the one or more features.

16. The computer-readable device of claim 15, wherein the SIP dialog comprises a call between the user agent and the terminating endpoint and wherein initiating the SIP dialog comprises exchanging identifiers for reconstruction anchors between reconstruction servers via SIP INVITE and SIP OK messages.

17. The computer-readable device of claim 16, wherein reconstructing the SIP dialog comprises:
   receiving, by the reconstruction server for the user agent, a SIP 481 NOT FOUND message from the server providing the one or more features to the SIP dialog;
   sending, by the reconstruction server for the user agent, a SIP 491 REQUEST PENDING message to the user agent;
   sending, by the reconstruction server for the user agent after the restart of the server providing the one or more features to the SIP dialog, a SIP in-dialog REFER message to the user agent;
   receiving, by the reconstruction server for the user agent, a SIP INVITE for a new SIP dialog from the user agent; and
   initiating, by the reconstruction server for the user agent, the new SIP dialog with the server providing the one or more features via the reconstruction anchor for the user agent, the new SIP dialog replacing the original SIP dialog.

18. The computer-readable device of claim 15, wherein the SIP dialog comprises a conference and wherein initiating the SIP dialog comprises exchanging identifiers for reconstruction anchors between reconstruction servers via SIP INVITE and SIP OK messages.

19. The computer-readable device of claim 18, wherein reconstructing the SIP dialog comprises:
   receiving, by the reconstruction server for the user agent, an out-of-dialog SIP REFER message from a conference controller following a restart of the conference controller;
   sending, by the reconstruction server for the user agent, an in-dialog SIP REFER message to the user agent;
   receiving, by the reconstruction server for the user agent, a SIP INVITE for a new SIP dialog from the user agent;
   initiating, by the reconstruction server for the user agent, the new SIP dialog with the conference controller via the reconstruction anchor for the user agent, the new SIP dialog replacing the original SIP dialog.

* * * * *